(12) United States Patent
Ganz et al.

(10) Patent No.: US 7,983,955 B2
(45) Date of Patent: Jul. 19, 2011

(54) SYSTEM AND METHOD FOR TIERED WEBSITE ACCESS

(75) Inventors: Howard Ganz, North York (CA); Karl Joseph Borst, Toronto (CA)

(73) Assignee: Ganz, Woodbridge, Ontario ( * ) Notice: Subject to any disclaimer, the term of this patent is extended or adjusted under 35 U.S.C. 154(b) by 974 days.

(21) Appl. No.: 11/856,356

(22) Filed: Sep. 17, 2007

(65) Prior Publication Data

US 2008/0141367 A1  Jun. 12, 2008

Related U.S. Application Data

(60) Provisional application No. 60/868,793, filed on Dec. 6, 2006.

(51) Int. Cl.
*G06Q 30/00* (2006.01)
(52) U.S. Cl. .............. 705/26.1; 705/14.1; 705/14.4
(58) Field of Classification Search .................. None
See application file for complete search history.

(56) References Cited

U.S. PATENT DOCUMENTS

| | | |
|---|---|---|
| 5,768,382 A | 6/1998 | Schneier et al. |
| 5,802,296 A | 9/1998 | Morse |
| 5,923,330 A | 7/1999 | Tarlton |
| 5,964,660 A | 10/1999 | James et al. |
| 6,009,458 A | 12/1999 | Hawkins et al. |
| 6,216,112 B1 | 4/2001 | Fuller et al. |
| 6,219,045 B1 | 4/2001 | Leahy et al. |
| 6,251,017 B1 | 6/2001 | Leason et al. |
| 6,267,672 B1 | 7/2001 | Vance |
| 6,343,990 B1 | 2/2002 | Rasmussen et al. |
| 6,468,155 B1 | 10/2002 | Zucker et al. |
| 6,476,830 B1 | 11/2002 | Farmer et al. |
| 6,539,400 B1 | 3/2003 | Bloomfield et al. |
| 6,595,858 B1 | 7/2003 | Tajiri et al. |
| 6,616,532 B2 | 9/2003 | Albrecht |
| 6,662,231 B1 | 12/2003 | Drosset et al. |
| 6,663,105 B1 | 12/2003 | Sullivan et al. |

(Continued)

FOREIGN PATENT DOCUMENTS

EP  1217560 A1  6/2002

(Continued)

OTHER PUBLICATIONS

Mark Ward, "Virtual Cash Exchange Goes Live" BBC News Online (Jan. 7, 2004).

(Continued)

*Primary Examiner* — Olabode Akintola
(74) *Attorney, Agent, or Firm* — Pearne & Gordon LLP

(57) ABSTRACT

A method of selling products and/or services using an interactive entertainment system. The method includes steps of: providing access to interactive content to a user at a first level of access over a computer network; selling a product and/or service to the user; responsive to the selling, providing access to the content at a second level of access over the network; receiving consent from the user to display advertisements along with the content; and responsive to the selling and the receiving, providing access to the content at a third level of access over the network. The first level of access provides first access privileges, the second level of access provides second access privileges that are excluded from the first level of access, and the third level of access provides the second access privileges and third access privileges that are excluded from the second level of access.

31 Claims, 1 Drawing Sheet

U.S. PATENT DOCUMENTS

| | | | |
|---|---|---|---|
| 6,773,325 B1 | 8/2004 | Mawle et al. | |
| 6,847,992 B1 | 1/2005 | Haitsuka et al. | |
| 6,892,201 B2 * | 5/2005 | Brown et al. | 1/1 |
| 6,910,186 B2 | 6/2005 | Kim | |
| 6,918,833 B2 | 7/2005 | Emmerson et al. | |
| 6,954,728 B1 | 10/2005 | Kusumoto et al. | |
| 7,039,940 B2 | 5/2006 | Weatherford | |
| 7,054,831 B2 | 5/2006 | Koenig | |
| 7,081,033 B1 | 7/2006 | Mawle et al. | |
| 7,094,154 B2 | 8/2006 | Kellerman et al. | |
| 7,155,680 B2 | 12/2006 | Akazawa et al. | |
| 7,179,171 B2 | 2/2007 | Forlines et al. | |
| 7,266,522 B2 | 9/2007 | Dutta et al. | |
| 7,297,063 B2 | 11/2007 | Fujisawa et al. | |
| 2002/0082077 A1 | 6/2002 | Johnson et al. | |
| 2002/0082913 A1 | 6/2002 | Li | |
| 2002/0100040 A1 | 7/2002 | Bull | |
| 2002/0113652 A1 | 8/2002 | Uto | |
| 2002/0147640 A1 | 10/2002 | Daniele et al. | |
| 2002/0183119 A1 | 12/2002 | Fessler | |
| 2003/0122864 A1 * | 7/2003 | Jenne et al. | 345/738 |
| 2003/0163371 A1 * | 8/2003 | Beard | 705/14 |
| 2004/0003398 A1 | 1/2004 | Donian et al. | |
| 2004/0043806 A1 | 3/2004 | Kirby et al. | |
| 2004/0242326 A1 | 12/2004 | Fujisawa et al. | |
| 2004/0249712 A1 | 12/2004 | Brown et al. | |
| 2005/0059483 A1 | 3/2005 | Borge | |
| 2005/0177428 A1 | 8/2005 | Ganz | |
| 2005/0192864 A1 | 9/2005 | Ganz | |
| 2005/0233744 A1 | 10/2005 | Karaoguz et al. | |
| 2005/0250415 A1 * | 11/2005 | Barthold | 446/465 |
| 2005/0250416 A1 | 11/2005 | Barthold | |
| 2006/0082068 A1 | 4/2006 | Patchen | |
| 2006/0093142 A1 | 5/2006 | Schneier et al. | |
| 2006/0129458 A1 | 6/2006 | Maggio | |
| 2006/0178976 A1 | 8/2006 | Vu | |
| 2006/0208074 A1 | 9/2006 | Eglen et al. | |
| 2006/0246970 A1 | 11/2006 | Smith et al. | |
| 2007/0033107 A1 | 2/2007 | Ubale et al. | |
| 2007/0050716 A1 | 3/2007 | Leahy et al. | |
| 2007/0110240 A1 | 5/2007 | Moskowitz et al. | |
| 2008/0140528 A1 | 6/2008 | Ganz et al. | |
| 2008/0163055 A1 | 7/2008 | Ganz et al. | |

FOREIGN PATENT DOCUMENTS

| | | |
|---|---|---|
| WO | 99/42917 A2 | 8/1999 |
| WO | 01/69829 A2 | 9/2001 |

OTHER PUBLICATIONS

"The Sims Booklet," dated 2000.

International Search Report for application No. PCT/CA2008/000008.

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

Matsude, "Evaluation of Personal Agent-Oriented Virtual Society—PAW", Presence—Massachusetts Institute of Technology; Apr. 2001.

* cited by examiner

US 7,983,955 B2

SYSTEM AND METHOD FOR TIERED WEBSITE ACCESS

CROSS-REFERENCES TO RELATED APPLICATIONS

This application claims the benefit of provisional application Ser. No. 60/868,793 filed on Dec. 8, 2006, incorporated herein by reference.

BACKGROUND OF THE INVENTION

1. Field of the Invention

This application relates generally to a system and method for multi-tiered website access.

More specifically, this application relates to an entertainment system including a website, wherein the system provides various levels of access depending upon certain conditions.

2. Description of the Related Art

The Internet has given rise to numerous interactive entertainment websites in which users can participate in various activities, including games and chat rooms, for free. In some cases, advertisements are displayed to the users in order to generate revenue for the owners of the websites. However, the revenue generated by these sites is limited, since there is no requirement that the user actually purchases the products or services contained in the advertisements. In order to generate additional revenue, some entertainment websites limit access to users who have purchased a product, service or a subscription to the site.

Other entertainment websites have incorporated incentive-based systems in which purchasers of products or services are provided access to additional web content. In these websites, access to web contents, such as games, is provided to all users for free. However, certain content, such as additional games or enhanced game play, is limited to users who enter a secret code that unlocks the content. The secret code can be provided to the user upon purchasing a product or service. For example, U.S. Pat. No. 6,267,672 to Vance, incorporated herein by reference, describes a remotely accessible game, such as an internet game, to encourage consumers to purchase a product. Consumers who purchase a product receive access information, such as a website URL and a code, which the consumer may then use to access and participate in the remotely accessible game.

More recently, entertainment websites have been developed in which the web-site content is directly tied to a product that is purchased by a user. For example, as disclosed in United States Patent Application Publication No. 2005/0192864 to Ganz, incorporated herein by reference, a user purchases a toy that includes a secret code provided in the toy packaging. Access to a certain interactive content on the website provided by the manufacturer of the toy is restricted to users who purchase a toy. When the user carries out a registration process on the manufacturer's website, which involves entering the secret code, a virtual world is presented to the user. The virtual world includes a virtual toy corresponding to the toy purchased by the user. The user can participate in various interactive activities involving the virtual toy. The user may then purchase additional toys and enter the secret codes provided with those toys to add additional virtual toys to the virtual world. These virtual toys can interact with each other, thereby enhancing the user's entertainment experiences. Further, after a predetermined period of time has lapsed since the secret code was registered, access to the website can be temporarily suspended until an additional purchase is made and a new code is registered. Thus, for both of these reasons, users are encouraged to continue to purchase additional toys in order to obtain additional secret codes.

SUMMARY OF THE INVENTION

Provided is method of delivering interactive content using an entertainment system. The method comprises steps of providing access to interactive content to a user at a first level of access over a computer network, said first level of access providing first access privileges; providing access to said interactive content to said user at a second level of access over said computer network in response to said user satisfying a first predetermined condition, said second level of access providing second access privileges that are excluded from said first level of access; and providing access to said interactive content to said user at a third level of access over said computer network in response to both said user satisfying said first predetermined condition and said user satisfying a second predetermined condition, said third level of access providing said second access privileges and third access privileges, the third access privileges being excluded from said second level of access.

Also provided, according to another aspect of the invention, is a method of selling products and/or services using an interactive entertainment system. The method comprises steps of providing access to interactive content to a user at a first level of access over a computer network, said first level of access providing first access privileges; selling a product and/or service to said user; after said selling, providing access to said interactive content to said user at a second level of access over said computer network, said second level of access providing second access privileges that are excluded from said first level of access; receiving consent from said user to display advertisements to said user along with said interactive content; and after said selling and said receiving, providing access to said interactive content to said user at a third level of access over said computer network, said third level of access providing said second access privileges and third access privileges that are excluded from said second level of access.

DETAILED DESCRIPTION OF THE EXAMPLE EMBODIMENTS

Figure 1:
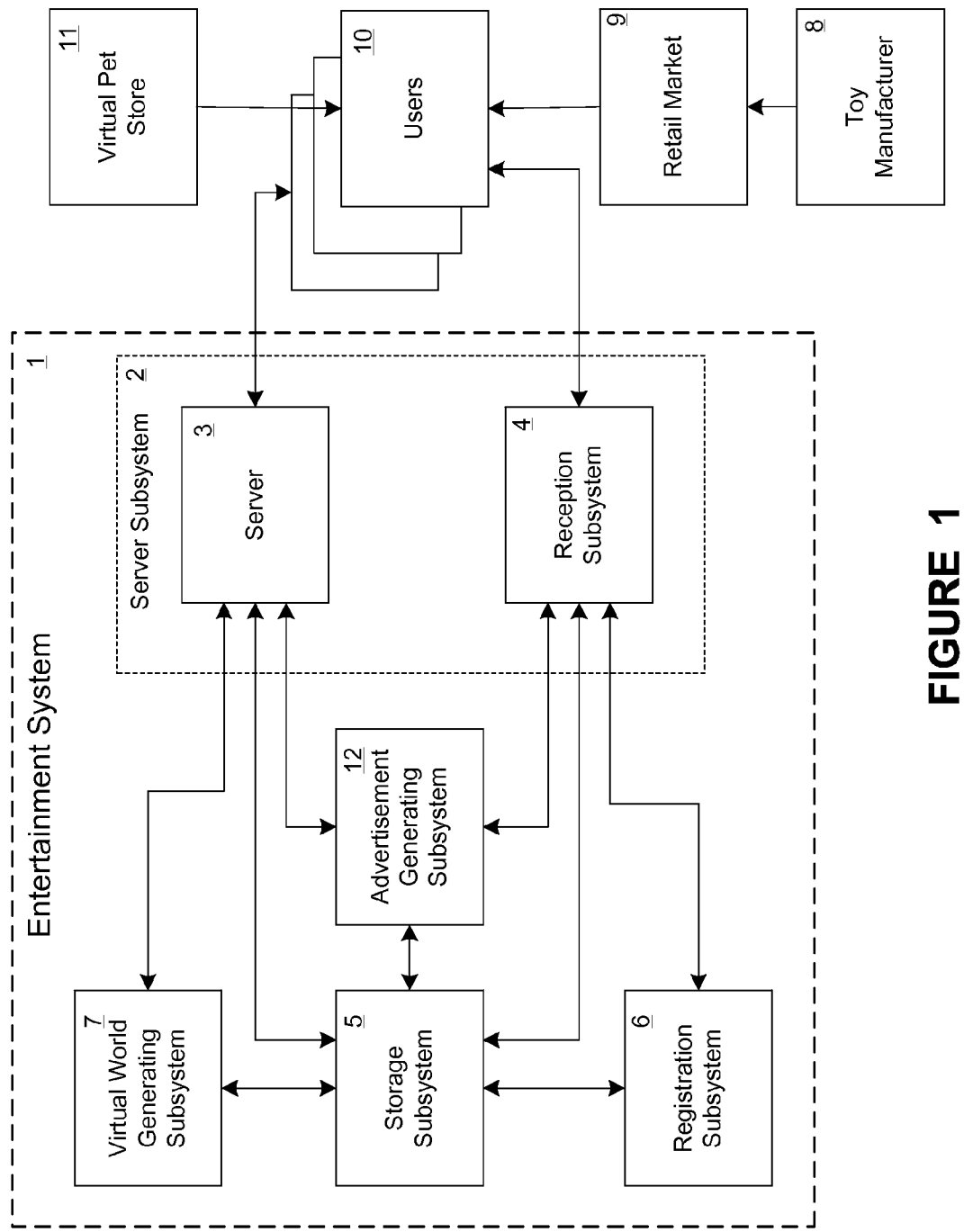
FIG. 1 shows a schematic block diagram of an example embodiment of an entertainment system and its interactions with some external entities.

Provided is an entertainment system including an online "virtual world" where the user of a toy or other product, such as a figurine or trading card, can register the product using a unique registration code provided with the product at purchase, register or adopt the product online, and play with a virtual representation of the product (a "virtual product") in the virtual world. The code may be provided in any way, including printed on a tag attached to the product, electronically stored in a memory attached to the product, or the like. In some embodiments, the "virtual world" can be implemented using an interactive website via a user computer connected to the Internet. In this manner, a user can play with the virtual toy in a computer generated fantasy world (i.e., the virtual world). As described in more detail throughout the specification and in United States Patent Application Publication No. 2005/0192864 to Ganz, the user entering the code provided with a toy causes a virtual toy to be created that corresponds to the toy.

The term "product" could include any type of product including a toy, a trading card, a figurine, or any other consumer good that can be purchased or otherwise obtained. The term "toy" could be any type of toy (for example, those used by a child), including, for example, plush toys (including but not limited to stuffed animals, fantasy figures, dinosaurs, vehicles, dolls, etc.), along with other types of toys (including, but not limited to, vehicles such as cars and trucks; action figures such as army figures, monsters, sports figures, fantasy figures, dinosaurs; and dolls, etc.). The term "character" could include any type of character, such as a real or imaginary person, a real or imaginary pet animal, a robot or other real or imaginary animate object.

Graphics, animation, sound, and even recorded images might be utilized to generate the virtual world and virtual product. Even live images might be utilized, if desired. In addition, other sources of material can also be utilized. In essence, the virtual world creates an interactive playland for the product owner to encourage imagination using the product, and at the same time, provide an incentive to purchase additional products or encourage additional individuals to also purchase products in order to participate in the entertainment system.

Throughout this disclosure, the term "virtual" is used, for example, to describe the user viewable/hearable material presented to the user on the user computer from data and/or computer programs and commands generated and/or provided by the entertainment system, to the user computer running one or more computer applications (e.g., a web browser with the appropriate plug-ins, applets, and/or other support programs, etc.). The entertainment system provides the data and/or programs, via a communication network connected to the entertainment system and the user computer (e.g., the Internet).

The term "virtual" does not necessarily mean that the displayed item is not "real", because the displayed item could, for example, be a video or picture of a real item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user. Furthermore, the user is provided access to games and trivia as well.

In an example embodiment, the user buys a product (such as a plush animal, a trading card or a figurine), registers the product in a website at an URL listed on the product or product packaging, or a tag on the product. The entertainment system serves or delivers interactive content, such as a website that provides the virtual world to the user using various web pages, provides a biography of the product, a virtual representation of the product (the virtual product) using graphics and/or sound (such as an animated image, for example) to participate in games and activities. The entertainment system also provides a virtual means for maintaining the "health and well-being" of the character through various maintenance activities, such as virtual feeding and playing, virtual shopping, and virtual medical checkups, for example.

More specifically, the entertainment system 1 of the example embodiment utilizes a server subsystem including a web server subsystem for generating both dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, java scripts, etc., to provide dynamic content to the user.

FIG. 1 shows a top-level block diagram of the entertainment system 1, interacting with various users 10. The users 10 should have previously purchased and registered one or more products from a retail merchant 9, who obtained the products from a manufacturer 8, or via a distributor. Alternatively, the users 10 may purchase a virtual character or pet, which is an image of a character or pet, from a virtual store 11.

If the user has not yet purchased a product, he can still access the entertainment system 10 to obtain information about the entertainment system and/or the products, but will not, in the example embodiment, have access to much of the site until a product is purchased and registered.

The entertainment system 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem. These systems can run on any conventional computer and be stored on any tangible medium such as a hard drive.

The entertainment system 1 also comprises a storage subsystem 5, for storing system data, user IDs and passwords, product registration codes, personalized user information, etc. utilized by the various subsystems. The storage subsystem 5 of the current system will utilize a commercially available database application running on commercially available hardware, for example.

A registration subsystem 6 is used for registering the user and the user's product into the entertainment system, so that the user has access to restricted portions of the entertainment system. The registration subsystem 6 may utilize its own dedicated application and hardware, or could be combined with or share the server subsystem 2 applications and/or hardware. The registration subsystem examines the registration code against stored data relating to a plurality of registration codes each representing a product for sale.

A virtual world providing subsystem 7 generates and/or provides the virtual world data to be served by the server 3 to the users 10 for use in displaying a virtual world on the user's computers. Portions of this data may be generated on the fly in response to user interactions, and portions are likely to be obtained and/or derived from data stored in the storage subsystem 5. For example, in the example embodiment, items owned by the user (the items in the dock for example), the virtual room state (virtual furniture in the room for example), virtual cash, health, happiness, hunger parameters are all examples of "stored data." Data generated on the fly, including a position in the room and arcade game scores also get stored.

Again, the virtual world providing subsystem 7 may utilize unique applications and/or hardware, or may be combined with one or more of the registration subsystem 6 and/or the server subsystem 2 applications and hardware.

An advertisement generating subsystem 12 generates and/or provides advertisements to be displayed on the user's computers. The advertisement generating subsystem 12 also provides a "sponsor area" that allows users to accumulate loyalty points by clicking on and/or viewing advertisements.

More specific details relating to an entertainment system which can be utilized according to the example embodiment are set forth, for example, in United States Patent Application Publication No. 2005/0192864 to Ganz, the disclosure of which is incorporated by reference herein. The entertainment system disclosed therein may provide some general services and features open to the public, such as information about the products and where to purchase them, a description of the features of the website, and other similar information. Accordingly, many of the features of the entertainment system are restricted to registered users to encourage product purchase.

According to the present disclosure, the above entertainment system is modified to offer tiered access. Furthermore, in the example embodiment, the entertainment system can be utilized for marketing additional products and/or accessories and/or services related to the product to allow restricted access to additional online activities and features to those who purchase the products.

The website can offer tiered access depending on various conditions, including whether the user has entered a registration code, or has acquired access through some other means. Each tier can provide a different level of access with corresponding access privileges.

For example, a four-tiered system of access to the website could be provided as follows. Users could obtain a free membership that will include access to the site at a first level of access, in which first access privileges are granted.

The first level of access could include advertisements ("ads") displayed on various site pages, which users are required to view in order to have free access to the website. Further, as an example, at the first level of access, a user could be limited to registering or adopting one of two "generic" characters or pets, which do not have physical product counterparts. In order to adopt other pets or register other characters, a user would have to purchase a corresponding product, as described above.

The first privileges provided with the first level of access could include most of the website's features, but with limited access to each. For example, a user could be limited to a predetermined number of available games to play, such as three or four. These games could be changed on a regular basis, such as weekly. User could be permitted to see other games, but not to play them. Further, at the first level of access, users may be limited to have a predetermined number of other users, such as five, in a "friends list" for chatting and playing multiple-player games with.

As described in more detail in United States Patent Application Publication No. 2005/0192864 to Ganz, users can be provided with virtual rooms in which their virtual pets can play, sleep, etc. Additional virtual rooms can be purchased so that users can construct a virtual house. At the first level of access, restrictions can be placed on the user's access of the website. These restrictions can include, for example, users being limited to obtaining predetermined number of virtual rooms, such as three, in their virtual world.

Further, at the first level of access, certain website content or areas can be restricted from use. For example, users at the first level of access may not have access to features such as community chat rooms, email or other messaging services, and sending and/or receiving virtual objects, such as food, furniture, clothing, etc., as gifts to other users.

As mentioned above, at the first level of access, ads will be displayed and the ads cannot be turned off or disabled. Further, a special "sponsor area" can be accessed that will allow the member to accumulate loyalty points by clicking on and/or viewing ads.

A second level of access could be obtained by a user either by satisfying a first predetermined condition, such as purchasing a plush toy or other product, paying directly for access, earning access by accumulating a predetermined number of loyalty points as described above, or otherwise obtaining a membership that includes the second level of access. Second access privileges, which are provided at the second level of access, may include complete access to the site along with the ability to turn off or disable the presentation of some or all ads as determined by the user. This may be desirable for parents who do not want their children exposed to the ads. The second access privileges are excluded from the first level of access.

The second level of access can be provided for a limited period of time. The period of time can vary depending upon how the user obtained such access. For example, if the user purchases a product or otherwise pays for the access, they could be provided access for a certain period, such as one year. If the user uses loyalty points to upgrade their account to the second level of access, the length of access can vary depending on amount of loyalty points used.

A user may be promoted to a third level of access by satisfying a second predetermined condition, such as by consenting to display ads, (i.e. turning the ads back on after they have been turned off). The third level of access includes third access privileges, which may include added bonuses such as weekly virtual cash or other currency and other prizes, free items, discounts, first looks at new games and features, priority access to certain aspects of the website, and exclusive access to certain contests and events. The third access privileges are excluded from the first and second levels of access. At any time, the user can choose to disable the ads, demoting the user to the second level of access. Further, as an alternative to viewing ads, it is contemplated that the third level of access could be obtained by satisfying some other predetermined condition such as purchasing an additional product and/or service.

Since the user may disable the ads at any time, the third access privileges may depend upon how long the user leaves the ads turned on. For example, if a user leaves the ads turned for a first predetermined period of time, such as one week, the user may receive a bonus of virtual currency. If the user leaves the ads on for a second predetermined period of time, such as one month, the user may receive an exclusive virtual item as a prize.

As mentioned above, after the limited period of time has passed from when the user obtains the second level of access, such as one year, the user's account will expire. At this point, however, the user moves from the second or third level of access to a fourth level of access. The fourth level of access may be substantially the same as the second level of access and may include the second access privileges, except that the user will be unable to disable the ads and the sponsor area. The user would not receive the third access privileges, such as the bonuses and priority access, even though the ads will be turned on. Further, additional limitations may be placed on the user, such as in the number of rooms the user may obtain. At the fourth level of access, certain third level privileges may be "grandfathered." For example, if a user already has more than the limited number of rooms in his or her house, or more than the limited number of other players in their friends list, they may be allowed to keep the rooms or other players, but they will not be able to add any more as long as they are in the fourth level of access. The user may restore the second level of access by again participating in one of the first activities, such as buying another product. Once the second level of access is restored, the user may choose to voluntarily view the ads, thereby promoting the user to the third level of access.

The four tiers described above are merely one example of a tiered system according to the present invention. Other tiered systems are possible according to the present invention, such as different numbers of levels, other access privileges, and other ways to promote and/or demote users. As an example alterative to the four tiers described above, the third level of access could be eliminated, thereby providing a three tier system.

By using a tiered system, advertising can be used to generate revenues for the site, whereas the user can take steps to avoid the advertisements by satisfying certain requirements, and/or users can earn bonuses by viewing ads. Advertising income can be based on the number of users that view the ads, and/or click through via the ads.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A method of selling products and/or services using an interactive entertainment system, comprising steps of:
   detecting access by a user over a computer network who has not purchased a product and/or service, and providing access to interactive content to the user at a first level of access over the computer network, said first level of access providing only first access privileges which only allows access to a first subset of said content;
   selling a product and/or service to said user;
   responsive to said selling, providing access to said interactive content to said user at a second level of access over said computer network, which provides access to additional content beyond said first subset of content including more content than said first subset of content, said second level of access providing second access privileges that are excluded from said first level of access;
   querying a user who has access to said second level of access about whether the user chooses to receive advertisements along with said interactive content;
   if said user does not choose to receive advertisements, providing only said second level of access to said user, where said second level of access includes said more content; and
   only if said user does choose to receive advertisements, after said selling, providing access to said interactive content to said user at a third level of access over said computer network, said third level of access providing said second access privileges and third access including bonus access that is beyond said second level of access, and is excluded from said second level of access, and is provided only to a user who has had a product or service sold to them and has also consented to display ads.

2. The method of claim 1, wherein said providing access to said interactive content to said user at said first level of access includes displaying said advertisements to said user, and further comprising a step of, after said selling, disabling said advertisements.

3. The method of claim 1, wherein said product and/or service is at least one of a toy, a figurine, a trading card, a consumer product, an image representing a character, a membership and a subscription.

4. The method of claim 1, wherein said third access privileges include at least one of free currency, free items, prizes, discounts, priority access to contests and other activities, and access to content excluded from said first level of access and said second level of access.

5. The method of claim 1 further comprising a step of, after a predetermined period of time has passed after said selling, providing access to said interactive content at a fourth level of access over said computer network, said fourth level of access providing said second access privileges without said third access privileges, and said fourth level of access requires said user to view said advertisements in order to access said interactive content.

6. The method of claim 5, wherein at said fourth level of access said user will be subject to restrictions in accessing said interactive content in addition to being required to view said advertisements.

7. The method of claim 6, wherein said interactive content includes images representing a world in which rooms are obtained by said user, wherein said restrictions include said user being limited to obtaining a predetermined number of rooms.

8. The method of claim 1, wherein said interactive content includes allowing said user to register one of a plurality of characters, wherein at said first level of access, said user is limited to registering one or more predetermined characters of said plurality of characters, and wherein at said second level of access, additional characters of said plurality of characters are registered by said user.

9. The method of claim 8, wherein a code is provided with a product that was purchased, and wherein said code causes said one of said plurality of characters that is registered by said user to correspond to said product.

10. The method of claim 9, wherein the product includes at least one of the code printed on a tag and the code stored in a memory device.

11. The method of claim 1, wherein said interactive content includes a plurality of games, wherein at said first level of access, said user is limited to playing one or more predetermined games of said plurality of games, and wherein at said second level of access, said user may play additional games of said plurality of games.

12. The method of claim 1, wherein said interactive content includes images representing a world in which rooms are obtained by said user, wherein at said first level of access, said user is limited to obtaining a predetermined number of rooms, and wherein at said second level of access, said user may obtain more than said predetermined number of rooms.

13. The method of claim 1, wherein said second access privileges include allowing said user to access additional interactive content.

14. The method of claim 13, wherein said additional interactive content includes at least one of rooms, games, chatting activities, messaging activities, sending objects to other users, and receiving objects from other users.

15. The method of claim 1, wherein said second level of access includes more games than said first level of access.

16. The method of claim 1, wherein said third level of access includes free virtual items and virtual bonuses on the website.

17. The method of claim 1, wherein said third level of access includes a first look at new content on the website prior to those who only had said second level of access.

18. A method of selling products and/or services using an interactive entertainment system, comprising steps of:

detecting access by a user over a computer network who has not purchased a product and/or service, and providing access to interactive content to the user at a first level of access over the computer network, said first level of access providing first access privileges and including displaying advertisements, the first level of access only allows access to a first subset of said content;

selling a product and/or service to said user, said product and/or service being at least one of a toy, a figurine, a trading card, a consumer product, an image representing a character, a membership and a subscription;

responsive to said selling, providing access to said interactive content to said user at a second level of access over said computer network, which provides access to additional content beyond said first subset of content including more content than said first subset of content, said second level of access providing second access privileges that are excluded from said first level of access and includes permitting said advertisements to be disabled;

querying a user who has access to said second level of access about whether the user chooses to receive said advertisements to said user along with said interactive content;

if said user does not choose to receive advertisements, providing only said second level of access to said user, where said second level of access includes said more content;

only if said user does choose to receive advertisements, after said selling, providing access to said interactive content to said user at a third level of access over said computer network, said third level of access providing said second access privileges and third access including bonus access that is beyond said second level of access, and is excluded from said second level of access; and after a predetermined period of time has passed after said selling, providing access to said interactive content at a fourth level of access over said computer network, said fourth level of access providing said second access privileges without said third access privileges, and said fourth level of access requires said user to view said advertisements in order to access said interactive content.

19. The method of claim 18, wherein said third access privileges include at least one of free currency, free items, prizes, discounts, priority access to contests and other activities, and access to content excluded from said first level of access and said second level of access.

20. The method of claim 18, wherein at said fourth level of access said user will be subject to restrictions in accessing said interactive content in addition to being required to view said advertisements.

21. The method of claim 20, wherein said interactive content includes images representing a world in which rooms are obtained by said user, wherein said restrictions include said user being limited to obtaining a predetermined number of rooms.

22. The method of claim 18, wherein said interactive content includes allowing said user to register one of a plurality of characters, wherein at said first level of access, said user is limited to registering one or more predetermined characters of said plurality of characters, and wherein at said second level of access, additional characters of said plurality of characters are registered by said user.

23. The method of claim 22, wherein said product and/or service is a product, wherein a code is provided with said product, and wherein said code causes said one of said plurality of characters that is registered by said user to correspond to said product.

24. The method of claim 23, wherein the product includes at least one of the code printed on a tag and the code stored in a memory device.

25. The method of claim 18, wherein said interactive content includes a plurality of games, wherein at said first level of access, said user is limited to playing one or more predetermined games of said plurality of games, and wherein at said second level of access, said user may play additional games of said plurality of games.

26. The method of claim 18, wherein said interactive content includes images representing a world in which rooms are obtained by said user, wherein at said first level of access, said user is limited to obtaining a predetermined number of rooms, and wherein at said second level of access, said user may obtain more than said predetermined number of rooms.

27. The method of claim 18, wherein said second access privileges include allowing said user to access additional interactive content.

28. The method of claim 27, wherein said additional interactive content includes at least one of rooms, games, chatting activities, messaging activities, sending objects to other users, and receiving objects from other users.

29. The method of claim 18, wherein said second level of access includes more games than said first level of access.

30. The method of claim 18, wherein said third level of access includes free virtual items and virtual bonuses on the website.

31. The method of claim 18, wherein said third level of access includes a first look at new content on the website prior to those who only had said second level of access.

* * * * *